United States Patent
Tamano

(10) Patent No.: US 10,890,744 B2
(45) Date of Patent: Jan. 12, 2021

(54) OBSERVATION APPARATUS AND OBJECTIVE

(71) Applicant: OLYMPUS CORPORATION, Hachioji (JP)

(72) Inventor: Shingo Tamano, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 72 days.

(21) Appl. No.: 16/423,801

(22) Filed: May 28, 2019

(65) Prior Publication Data

US 2019/0369377 A1 Dec. 5, 2019

(30) Foreign Application Priority Data

May 30, 2018 (JP) ................................ 2018-102977

(51) Int. Cl.
| | | |
|---|---|---|
| *G02B 21/00* | (2006.01) | |
| *G01N 21/64* | (2006.01) | |
| *G02B 21/04* | (2006.01) | |

(52) U.S. Cl.
CPC ..... *G02B 21/0076* (2013.01); *G01N 21/6458* (2013.01); *G02B 21/04* (2013.01); *G01N 2201/06113* (2013.01)

(58) Field of Classification Search
CPC ............... G02B 21/0076; G02B 21/04; G02B 2207/114; G02B 21/0064; G01N 21/6458; G01N 2201/06113
See application file for complete search history.

(56) References Cited

U.S. PATENT DOCUMENTS

| | | | |
|---|---|---|---|
| 4,961,001 A | * | 10/1990 | Liegel ................ G03F 7/70241 250/491.1 |
| 5,995,281 A | | 11/1999 | Ulrich et al. |
| 6,178,041 B1 | | 1/2001 | Ulrich |
| 2005/0279950 A1 | | 12/2005 | Yoshihiro et al. |
| 2006/0237666 A1 | | 10/2006 | Hiroichi et al. |
| 2007/0120070 A1 | | 5/2007 | Yoshihiro et al. |
| 2014/0376575 A1 | * | 12/2014 | Kono ................... H01S 3/2308 372/18 |
| 2015/0229093 A1 | | 8/2015 | Kaertner et al. |

FOREIGN PATENT DOCUMENTS

| | | |
|---|---|---|
| JP | 11218490 A | 8/1999 |
| JP | 2005257509 A | 9/2005 |
| JP | 2006330685 A | 12/2006 |
| JP | 2008009143 A | 1/2008 |
| JP | 2015156487 A | 8/2015 |

\* cited by examiner

*Primary Examiner* — Christine S. Kim
(74) *Attorney, Agent, or Firm* — Holtz, Holtz & Volek PC

(57) ABSTRACT

An observation apparatus includes: alight source that emits pulsed light; and an objective that includes a first optical element serving as a light guide part and irradiates a sample with the pulsed light. The first optical element consists of a medium that satisfies the following conditional expression for $\theta 1$ and $\theta 2$:

$$0.75 < \theta 2/\theta 1 < 1.33$$

where $\theta 1=(n2-n1)/(\lambda 2-\lambda 1)$ and $\theta 2=(n3-n2)/(\lambda 3-\lambda 2)$ are satisfied ($\lambda 1$ indicates a light wavelength of 706.52 nm; $\lambda 2$ indicates a light wavelength of 1529.6 nm; $\lambda 3$ indicates a light wavelength of 2325.4 nm; and n1, n2, and n3 respectively indicate refractive indexes that the medium has for $\lambda 1$, $\lambda 2$, and $\lambda 3$).

13 Claims, 10 Drawing Sheets

OBSERVATION APPARATUS AND OBJECTIVE

CROSS REFERENCE TO RELATED APPLICATIONS

This application is based upon and claims the benefit of priority from prior Japanese Patent Application No. 2018-102977, filed May 30, 2018, the entire contents of which are incorporated herein by this reference.

BACKGROUND OF THE INVENTION

Field of the Invention

The present invention relates to an observation apparatus for observations of biological sample using pulsed light and to an objective included in the same.

Description of the Related Art

A generally known observation method uses a multiphoton excitation process in which a high-density photon state is achieved to simultaneously absorb a plurality of photons. This observation method is such that only fluorescence locally generated at a focal plane of the objective can be observed, thereby achieving a high spatial resolution and excellent anti-fading characteristics.

Pulsed light that is small in pulse width and thus can achieve a high photon density is used in an observation using the multiphoton excitation process. Meanwhile, pulsed light is dispersed when passing through a medium. In particular, if light components of different wavelengths within the pulsed light become different in velocity due to dispersion, this will result in a distorted light waveform and thus lead to a problem of an increased pulse width. A conventionally known technique for avoiding such a problem involves delaying light components of long wavelengths included in pulsed light so as to compensate for dispersion causing distortion of a pulse waveform and thus prevent the pulse width from being increased. Compensating for dispersion causing distortion of a pulse waveform and compensating for dispersion causing a group delay will hereinafter be referred to as dispersion compensation.

Japanese Laid-open Patent Publication Nos. 2008-9143, 11-218490, 2005-257509, 2015-156487, and 2006-330685 describe techniques for dispersion compensation.

Japanese Laid-open Patent Publication No. 2008-9143 describes a pre-chirper that includes a pair of prisms for compensating for group velocity dispersion. Paragraph [0023] indicates adjusting optical path lengths for individual wavelengths by adjusting the intervals between prisms.

Japanese Laid-open Patent Publication No. 11-218490 describes a feature provided with a pre-chirping unit that includes four lattices.

Paragraph [0020] of Japanese Laid-open Patent Publication No. 2005-257509 indicates an optical fiber that provides as much negative group velocity dispersion as is equivalent to the total positive group velocity dispersion provided by various optical systems.

Japanese Laid-open Patent Publication No. 2015-156487 describes a chirped dichroic mirror that controls dispersion of a composite/split beam.

Japanese Laid-open Patent Publication No. 2006-330685 describes a multiphoton-excitation scanning laser microscope that includes a dispersion compensation mechanism provided with a pair of prisms or gratings.

SUMMARY OF THE INVENTION

An observation apparatus in accordance with an aspect of the present invention includes: a light source that emits pulsed light; and an objective that includes a first optical element serving as a light guide part and irradiates a sample with the pulsed light. The first optical element consists of a medium that satisfies the following conditional expression for $\theta 1$ and $\theta 2$:

$$0.75 < \theta 2/\theta 1 < 1.33$$

where $\theta 1 = (n2-n1)/(\lambda 2-\lambda 1)$ and $\theta 2 = (n3-n2)/(\lambda 3-\lambda 2)$ are satisfied ($\lambda 1$ indicates a light wavelength of 706.52 nm; $\lambda 2$ indicates a light wavelength of 1529.6 nm; $\lambda 3$ indicates a light wavelength of 2325.4 nm; and n1, n2, and n3 respectively indicate refractive indexes that the medium has for $\lambda 1$, $\lambda 2$, and $\lambda 3$).

An objective in accordance with an aspect of the invention includes an optical element serving as a light guide part, wherein the optical element consists of a medium that satisfies the following conditional expression for $\theta 1$ and $\theta 2$:

$$0.75 < \theta 2/\theta 1 < 1.33$$

where $\theta 1 = (n2-n1)/(\lambda 2-\lambda 1)$ and $\theta 2 = (n3-n2)/(\lambda 3-\lambda 2)$ are satisfied ($\lambda 1$ indicates a light wavelength of 706.52 nm; $\lambda 2$ indicates a light wavelength of 1529.6 nm; $\lambda 3$ indicates a light wavelength of 2325.4 nm; and n1, n2, and n3 respectively indicate refractive indexes that the medium has for $\lambda 1$, $\lambda 2$, and $\lambda 3$).

BRIEF DESCRIPTION OF THE DRAWINGS

The present invention will be more apparent from the following detailed description when the accompanying drawings are referenced.

DESCRIPTION OF THE EMBODIMENTS

As a general rule, using longer wavelengths tends to result in a smaller rate of change in refractive index between the wavelengths of a glass material. Accordingly, when pulsed light has a center wavelength included in a long wavelength region, negative dispersion will be more difficult to provide in performing dispersion compensation than in a situation in which the center wavelength of pulsed light is included in a short wavelength region. This will result in a problem of the need to have a dispersion compensation mechanism large-sized. For example, for pulsed light having a center wavelength included in a long wavelength region, when dispersion compensation is performed using a pair of prisms, necessary negative dispersion may need to be caused by arranging the prisms with a longer distance therebetween than in a situation in which the center wavelength of pulsed light is included in a short wavelength region. Especially in recent years, such problems could be more remarkable as pulsed light in an infrared region, i.e., a region having a longer wavelength than a near-infrared region, has started to be used.

In the meantime, reducing dispersion that could occur within an optical element will decrease the amount of negative dispersion that needs to be caused within a dispersion compensation apparatus, thereby allowing dispersion compensation to be easily achieved even when pulsed light in a long wavelength region is used.

Figure 1:
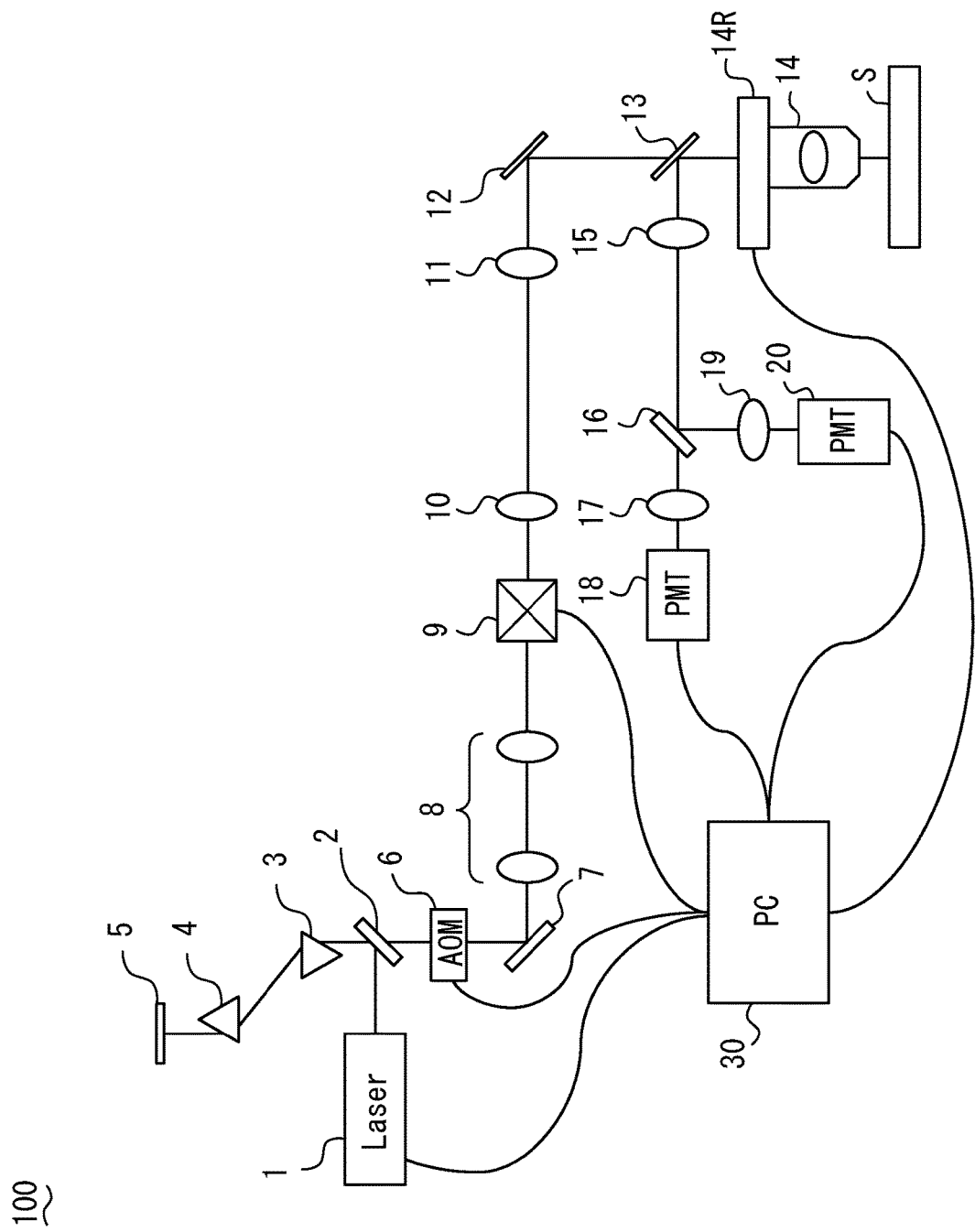
FIG. 1 illustrates the configuration of a multiphoton excitation microscope in accordance with a first embodiment.

The following describes a multiphoton excitation microscope 100, i.e., an observation apparatus in accordance with a first embodiment of the present invention. FIG. 1 illustrates the configuration of the multiphoton excitation microscope 100.

The multiphoton excitation microscope 100 includes a laser 1, a mirror 2, prisms 3 and 4, a mirror 5, an acousto-optical modulator 6, a mirror 7, a beam expander 8, a scanner 9, lenses 10 and 11, a mirror 12, a dichroic mirror 13, an objective 14, a lens 15, a dichroic mirror 16, a lens 17, a PMT 18, a lens 19, a PTM 20, and a control apparatus 30.

The laser 1 outputs pulsed light having a pulse width on the order of femtoseconds to cause a multiphoton excitation process in a sample S. The laser 1 includes an oscillator for oscillating pulsed light and guides and emits pulsed light. The laser 1 may include a plurality of oscillators that oscillate rays of pulsed light in different wavelength regions, i.e., rays of pulsed light each having a different center wavelength.

The prisms 3 and 4 are examples of dispersion compensation mechanisms for compensating for dispersion that could distort a light waveform. The distortion of a light waveform results from a group delay caused by dispersion that occurs while pulsed light output from the laser 1 passes through optical elements within the multiphoton excitation microscope 100.

In particular, dispersion compensation is performed by adjusting the distance between the prisms 3 and 4 so as to change an optical path length for individual light wavelengths. The distance between the prisms 3 and 4 is adjusted in a manner such that light components of long wavelengths included in pulsed light output by the laser 1 have a long optical path so as to cause appropriate negative dispersion in the pulsed light, thereby compensating for dispersion that causes a group delay.

The acousto-optical modulator (AOM) 6 modulates the optical intensity of pulsed light.

The beam expander 8 changes the diameter of a pencil of pulsed light.

The scanner 9 performs scanning with pulsed light in a direction orthogonal to the optical axis. The scanner 9 scans a surface of a sample S with pulsed light sent via the objective 14 so that rays of fluorescence can be acquired from different positions on the sample S.

The objective 14 irradiates a sample S with pulsed light and acquires fluorescence generated from the sample S. Specific features of the objective 14 will be described hereinafter.

The PMTs (photomultiplier tubes) 18 and 20 each generate an electrical signal by photoelectrically converting fluorescence acquired by the objective 14.

The control apparatus 30 is a computer and generates a fluorescence image of a sample S from an electrical signal generated by the PMT 18 or 20. The control apparatus 30, which is connected to a monitor (not illustrated), outputs the generated fluorescence image to the monitor for display.

The control apparatus 30 is connected to the laser 1, the acousto-optical modulator 6, the scanner 9, and a focusing mechanism 14R. The focusing mechanism 14R has the objective 14 mounted thereon. The control apparatus 30 controls ON and OFF of pulsed light from the laser 1 and performs control for switching between oscillators for oscillating the pulsed light. The control apparatus 30 controls intensity modulation performed by the acousto-optical modulator 6. The control apparatus 30 sets a parameter related to scanning, such as a scanning velocity, and controls scanning performed by the scanner 9. The control apparatus 30 controls the moving up or down of the focusing mechanism 14R so as to change the distance between the objective 14 and a sample S.

The following describes an optical path of pulsed light output from the laser 1 and an optical path of fluorescence generated from a sample S.

Pulsed light output from the laser 1 is reflected from the mirror 2 and reaches the mirror 5 via the prisms 3 and 4. Pulsed light reflected from the mirror 5 is incident on the acousto-optical modulator 6 after traveling via the prisms 3 and 4. The pulsed light traveling via the prisms 3 and 4 after being reflected from the mirror 5 deviates from the pulsed light output from the laser 1 in a direction orthogonal to the paper surface and is not incident on the mirror 2, i.e., travels without passing via the mirror 2.

Pulsed light that has undergone intensity modulation performed by the acousto-optical modulator 6 is incident on the scanner 9 after passing via the mirror 7 and the beam expander 8 and then irradiates the sample S after passing via the lenses 10 and 11, the mirror 12, the dichroic mirror 13, and the objective 14. The dichroic mirror 13 is adjusted to allow passage of pulsed light and reflect fluorescence generated from the sample S.

Fluorescence generated from the sample S is reflected from the dichroic mirror 13, then travels via the lens 15, and is finally incident on the dichroic mirror 16. The dichroic mirror 16 guides rays of fluorescence having different wavelengths to the PMTs 18 and 20. This example is based on the assumption that rays of fluorescence having different wavelengths are generated in accordance with what wavelength region pulsed light that is actually used is included in.

An optical element serving as a light guide part of the objective 14 (this optical element is also referred to as a first optical element) consists of a medium that satisfies a conditional expression (1) indicated below. The "optical element serving as a light guide part" indicates a lens group included in the objective 14. Accordingly, materials for all lenses constituting the objective 14 satisfy conditional expression (1). The "light guide part of the objective 14" refers to a lens portion serving as an optical element of the objective 14 that guides light. Note that θ1 and θ2 in conditional expression (1) are defined by conditional expressions (2) and (3).

$$0.75 < \theta 2/\theta 1 < 1.33 \tag{1}$$

$$\theta 1 = (n2-n1)/(\lambda 2-\lambda 1) \tag{2}$$

$$\theta 2 = (n3-n2)/(\lambda 3-\lambda 2) \tag{3}$$

In these conditional expressions, λ1 indicates a light wavelength of 706.52 nm; λ2 indicates a light wavelength of 1529.6 nm; λ3 indicates a light wavelength of 2325.4 nm; and n1, n2, and n3 respectively indicate refractive indexes that a medium constituting the light guide part of the objective 14 has for λ1, λ2, and λ3.

θ1 indicates the ratio of a change in refractive index to a change in wavelength between a light wavelength of 706.52 nm and a light wavelength of 1529.6 nm. Similarly, θ2 indicates the ratio of a change in refractive index to a change in wavelength between a light wavelength of 1529.6 nm and a light wavelength of 2325.4 nm. Accordingly, conditional expression (1) indicates that the ratio of a change in refractive index to a change in wavelength between 706.52 nm and 1529.6 nm and the ratio of a change in refractive index to a change in wavelength between 1529.6 nm and 2325.4 nm approximate each other.

Figure 2:
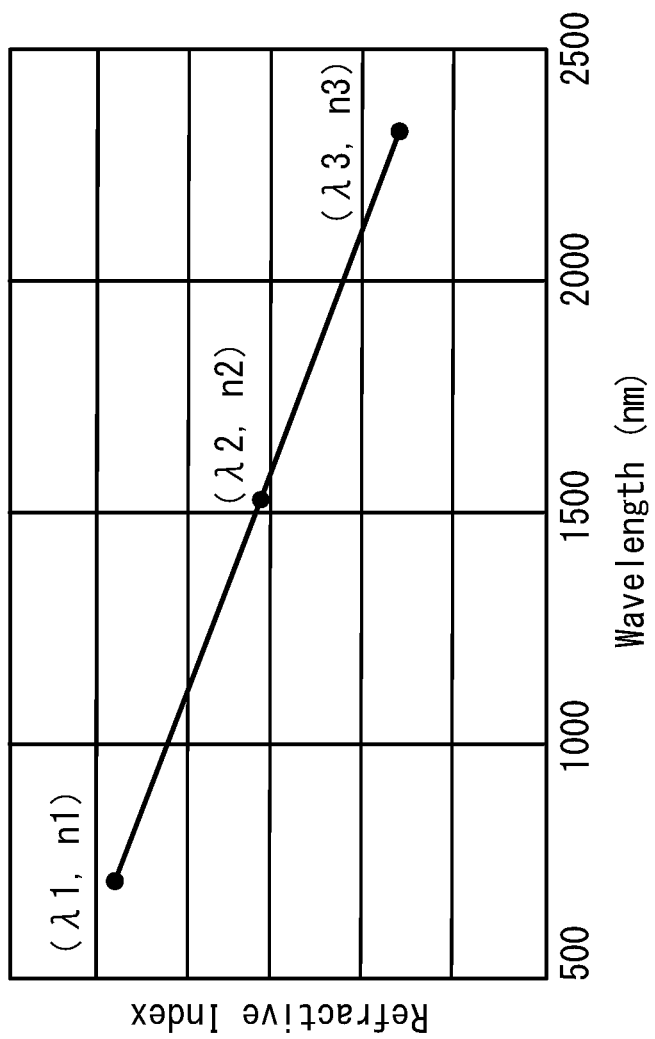
FIG. 2 is a graph indicating the rate of a change in refractive index with reference to wavelength.

FIG. 2 is a graph indicating the rate of a change in refractive index with reference to wavelength and intended to give descriptions of conditional expression (1). The above-described condition in which the ratios of a change in refractive index to a change in wavelength approximate each other corresponds to a condition in which the distance from a straight line extending via (λ1, n1) and (λ2, n2) within the graph depicted in FIG. 2 to (λ3, n3) is short. Configuring the light guide part of the objective 14 with a medium satisfying such a condition makes an approximately linear change in refractive index between wavelengths for a range from λ1 to λ3, i.e., an approximately linear relationship is achieved between the wavelength and the refractive index. In the meantime, group delay dispersion corresponds to the product of group velocity dispersion and the length of a medium. Group velocity distribution relates to a 2th-derivative of refractive index with respect to a wavelength twice. Accordingly, as the shape of a refractive index change between wavelengths becomes closer to a liner shape, group delay dispersion is reduced, thereby contributing to elimination of distortion of a waveform.

In recent years, pulsed light in an infrared region, i.e., a wavelength region longer than a near-infrared region, has started to be used, and light in a longer wavelength region may be used as excitation light. As a general rule, using a longer wavelength region tends to result in a smaller rate of change in refractive index between the wavelengths of a glass material. Hence, performing dispersion compensation for a long wavelength region, in comparison with performing dispersion compensation for a short wavelength region, will make negative dispersion unlikely to be caused by a dispersion compensation mechanism such as a prism. When, for example, a pair of prisms are used, these prisms need to have a long distance therebetween to provide necessary negative dispersion, and this will result in a problem of the need to have the dispersion compensation mechanism large-sized.

In the meantime, the multiphoton excitation microscope 100 is such that the light guide part of the objective 14 consists of a medium that satisfies conditional expression (1), i.e., a medium achieving an approximately linear relationship between wavelength and refractive index, thereby reducing a group delay for a range from λ1 to λ3 that includes a long wavelength region. Accordingly, the amount of dispersion that needs to be caused by the dispersion compensation mechanism, i.e., the amount of dispersion for canceling out dispersion that can be caused within the optical system of the multiphoton excitation microscope 100, is decreased so that the entirety of the apparatus, including the dispersion compensation apparatus, does not need to be large-sized. In other words, the objective 14 of the multiphoton excitation microscope 100 can reduce dispersion to be generated within the apparatus so that dispersion that could cause a group delay can be eliminated without the prisms 3 and 4 having a long distance therebetween.

The following indicates an example of lens data of an objective that does not satisfy conditional expression (1) and an example of lens data of the objective 14 that satisfies conditional expression (1). Table 1 indicates an example of lens data of an objective that does not satisfy conditional expression (1). Table 2 indicates an example of lens data of the objective 14. Note that ROC is radius of curvature in Table 1 and Table 2.

TABLE 1

| Surface Num | ROC | Interval | Reflective Idx | Abbe Num |
|---|---|---|---|---|
| 1 | 12.283 | 2.8 | 1.65754 | 38.15 |
| 2 | 18.641 | 8.297 | 1 | |
| 3 | 15.305 | 2.2 | 1.60085 | 44.27 |
| 4 | 8.001 | 5.773 | 1 | |
| 5 | -6.077 | 2.162 | 1.72789 | 52.64 |
| 6 | -35.204 | 10.0246 | 1.49126 | 81.14 |
| 7 | -10.942 | 0.27 | 1 | |
| 8 | 21.880 | 1.9 | 1.72789 | 52.64 |
| 9 | 12.629 | 9.664 | 1.43436 | 94.97 |
| 10 | -13.715 | 1.9 | 1.65754 | 38.15 |
| 11 | -43.993 | 0.592 | 1 | |
| 12 | 17.894 | 9 | 1.43436 | 94.93 |
| 13 | -15.172 | 1.9 | 1.65754 | 38.15 |
| 14 | -126.656 | 4 | 1.49126 | 81.14 |
| 15 | -24.204 | 1.183 | 1 | |
| 16 | 13.634 | 3.6 | 1.56178 | 71.3 |
| 17 | 36.526 | 0.477 | 1 | |
| 18 | 6.861 | 5.709 | 1.75821 | 49.6 |
| 19 | 5.990 | 1.15 | 1.45182 | 67.83 |

TABLE 2

| Surface Num | ROC | Interval | Reflective Idx | Abbe Num |
|---|---|---|---|---|
| 1 | 12.418 | 2.801 | 1.63775 | 42.41 |
| 2 | 19.904 | 8.296 | 1 | |
| 3 | 15.697 | 2.199 | 1.6134 | 44.27 |
| 4 | 8.024 | 5.774 | 1 | |
| 5 | -6.103 | 2.164 | 1.741 | 52.64 |
| 6 | -35.291 | 10.026 | 1.497 | 81.54 |
| 7 | -11.044 | 0.271 | 1 | |
| 8 | 22.116 | 1.899 | 1.741 | 52.64 |
| 9 | 13.053 | 9.662 | 1.43875 | 94.97 |
| 10 | -13.068 | 1.898 | 1.63775 | 42.41 |
| 11 | -43.867 | 0.590 | 1 | |
| 12 | 18.374 | 8.997 | 1.43875 | 94.93 |

TABLE 2-continued

| Surface Num | ROC | Interval | Reflective Idx | Abbe Num |
|---|---|---|---|---|
| 13 | −15.618 | 1.900 | 1.63775 | 42.41 |
| 14 | 1881.700 | 3.998 | 1.497 | 81.54 |
| 15 | −25.518 | 1.182 | 1 | |
| 16 | 13.995 | 3.600 | 1.59522 | 67.74 |
| 17 | 37.102 | 0.477 | 1 | |
| 18 | 6.927 | 5.708 | 1.7725 | 49.6 |
| 19 | 5.998 | 1.150 | 1.45852 | 67.83 |

Figure 3:
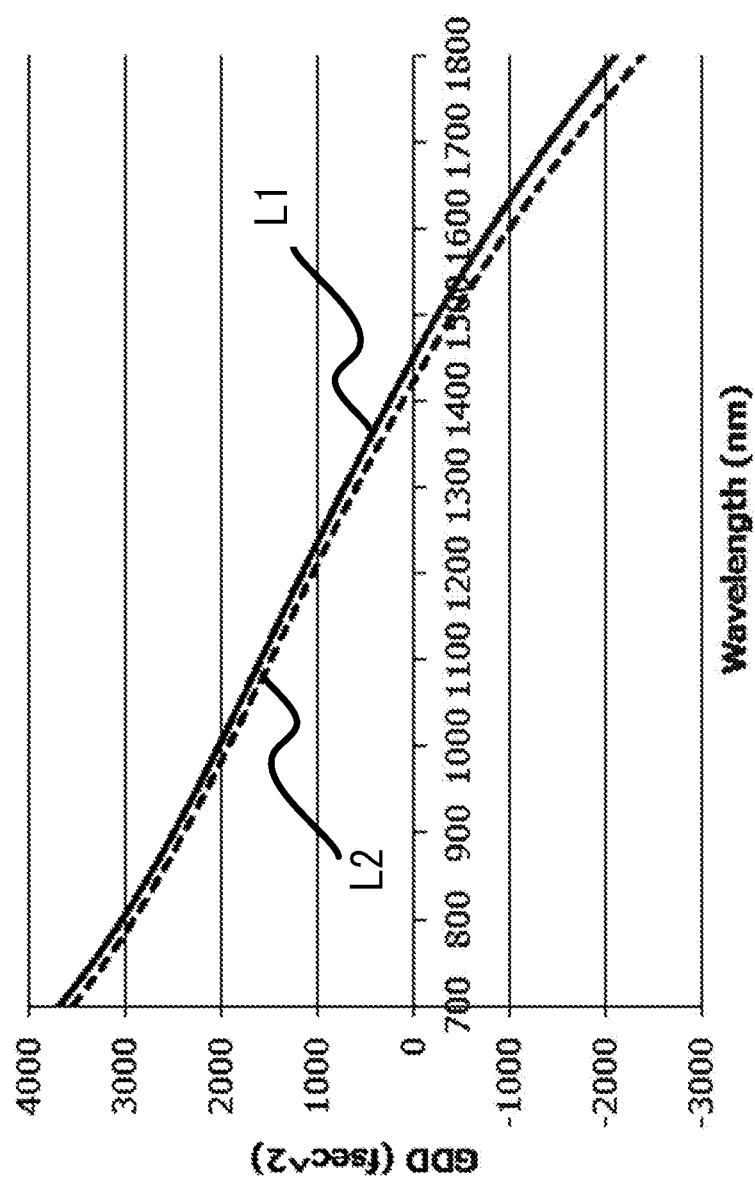
FIG. 3 is a graph indicating group delay dispersions caused by objectives with reference to wavelength.

FIG. 3 is a graph indicating group delay dispersions (GDDs) caused by objectives for individual light wavelengths. Solid line L1 indicates group delay dispersion caused by an objective corresponding to the lens data of table 1 that does not satisfy the conditional expression of the present invention. Dash line L2 indicates group delay dispersion caused by an objective corresponding to the lens data of table 2 that satisfies the conditional expression of the invention. As depicted in FIG. 3, the dispersion specific to the lens data of table 2 is displaced overall in a negative direction, in comparison with the dispersion specific to the lens data of table 1. As a general rule, dispersion occurs in a positive direction within various optical elements included in a multiphoton excitation microscope, such as an acousto-optical modulator, and such positive dispersion is a cause of distortion of the waveform of pulsed light. Accordingly, incorporating an objective indicated by the lens data of table 2 that satisfies the conditional expression (1) of the invention into a multiphoton excitation microscope as a component allows positive dispersion, which can be a cause of distortion of a light waveform, to be reduced, thereby decreasing the amount of dispersion that needs to be eliminated by a dispersion compensation apparatus.

Figure 4:
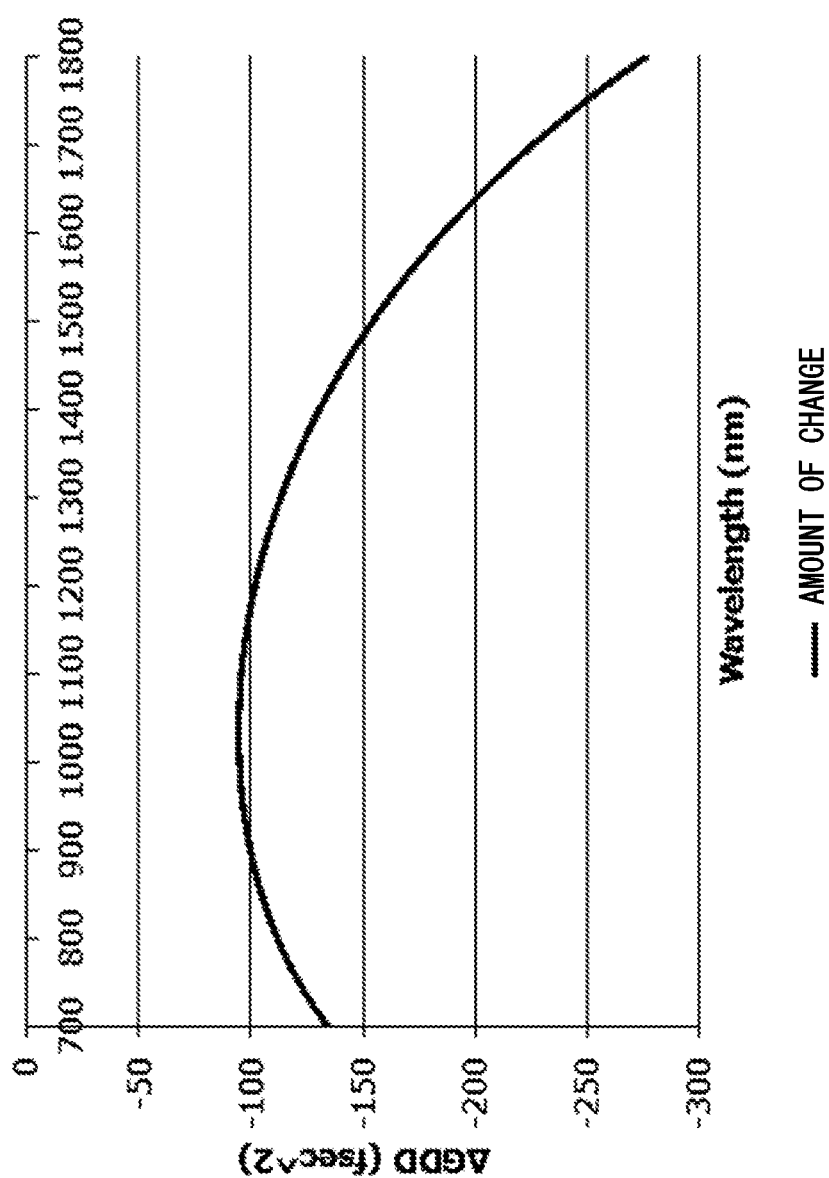
FIG. 4 is a graph indicating an amount of group delay dispersion caused by an objective that corresponds to table 2 with subtracted therefrom group delay dispersion caused by an objective that corresponds to table 1.

FIG. 4 is a graph indicating the amount of change from group delay dispersion caused by an objective that corresponds to table 1 to group delay dispersion caused by an objective that corresponds to table 2. In particular, this graph indicates an amount of group delay dispersion caused by an objective that corresponds to table 2 with subtracted therefrom group delay dispersion caused by an objective that corresponds to table 1. The horizontal axis indicates the wavelength, and the vertical axis indicates the amount of change in group delay dispersion. The amount of change in group delay dispersion is represented as ΔGDD. As depicted in FIG. 4, in comparison with the lens data of table 1, the lens data of table 2 is such that a large amount of change in dispersion in the negative direction is made on the long-wavelength side. As described above, as a general rule, using a longer wavelength results in a smaller rate of change in refractive index between the wavelengths of a glass material. This makes it difficult for the dispersion compensation mechanism to cause negative dispersion, and group delay dispersion becomes difficult to eliminate. By contrast, using an objective that satisfies conditional expression (1) allows positive dispersion to be remarkably reduced on the long-wavelength side, i.e., a side on which negative dispersion is difficult to be caused by the dispersion compensation mechanism, thereby decreasing the amount of dispersion that the dispersion compensation mechanism would need to eliminate. Accordingly, the multiphoton excitation microscope 100 that includes the objective 14 can effectively perform dispersion compensation without a large-sized dispersion compensation mechanism.

Figure 5:
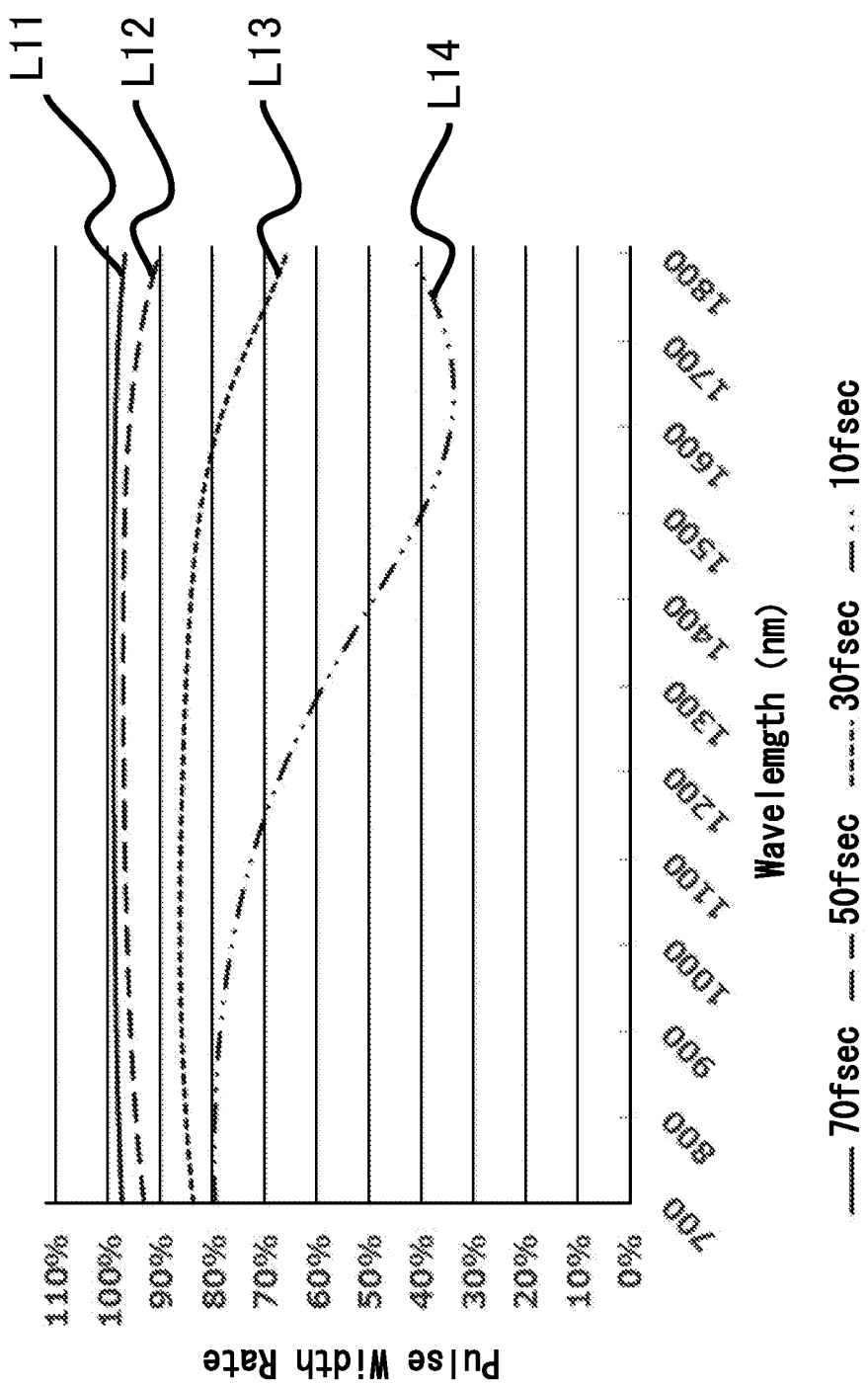
FIG. 5 is a graph indicating the percentage of a pulse width provided when an objective 14 that corresponds to table 2 is used, where a pulse width provided when an objective that corresponds to table 1 is used corresponds to 100%.

FIG. 5 is a graph indicating the percentage of a pulse width provided when the objective 14 that corresponds to table 2 is used, where a pulse width provided when an objective that corresponds to table 1 is used corresponds to 100%. Solid line L11 indicates the percentage achieved when pulsed light having a pulse width of 70 fsec is used while an oscillator oscillates. Long-dash line L12 indicates the percentage achieved when pulsed light having a pulse width of 50 fsec is used while an oscillator oscillates. Dash line L13 indicates the percentage achieved when pulsed light having a pulse width of 30 fsec is used while an oscillator oscillates. Tow-dot chain line L14 indicates the percentage achieved when pulsed light having a pulse width of 10 fsec is used while an oscillator oscillates. Accordingly, FIG. 5 indicates that when an objective 14 that corresponds to table 2 is used, a narrower pulse width during oscillation will result in a larger effect of improving the spread of the pulse width.

As a general rule, a microscope that implements three-photon excitation, which requires higher energy than two-photon excitation, is estimated to use pulsed light that has a narrow pulse width during oscillation so as to enhance the multiphoton excitation efficiency. A narrower pulse width will lead to a larger influence of energy loss per pulse that would be caused by an increase in the pulse width that is associated with dispersion. The present invention achieves the advantageous effect of eliminating group delay dispersion more effectively for light having a narrow pulse width during oscillation, so that a more advantageous effect related to a reduction in group delay dispersion can be expected for a microscope that causes an excitation process in which two or more photons are simultaneously absorbed.

As described above, the optical element that is a light guide part of the objective 14 consists of a medium that satisfies conditional expression (1), thereby reducing dispersion that is caused by the optical elements within the apparatus when pulsed light having a wavelength region within a range from λ1 to λ3 is used. Hence, the amount of negative dispersion that needs to be caused by the dispersion compensation mechanism is decreased so that dispersion compensation for pulsed light can be achieved effectively. As indicated in, among other things, FIGS. 4 and 5, positive dispersion, which would be a cause of distortion of the light waveform, is reduced effectively on the long-wavelength side, and hence the apparatus configuration, including the dispersion compensation apparatus, does not need to be large-sized.

In the first embodiment, the light guide part of the objective 14 consists of a material that satisfies conditional expression (1). However, it will be more desirable that each optical element disposed between the scanner 9 and objective 14 of the multiphoton excitation microscope 100 (also referred to as a second optical element) consists of a medium that satisfies conditional expression (1). This is because it will be desirable that relatively large dispersion that could be caused by the scanner 9 be reduced by many components. It will be much more desirable that each optical element disposed within the multiphoton excitation microscope 100 (also referred to as a third optical element) consists of a material that satisfies conditional expression (1).

Figure 6:
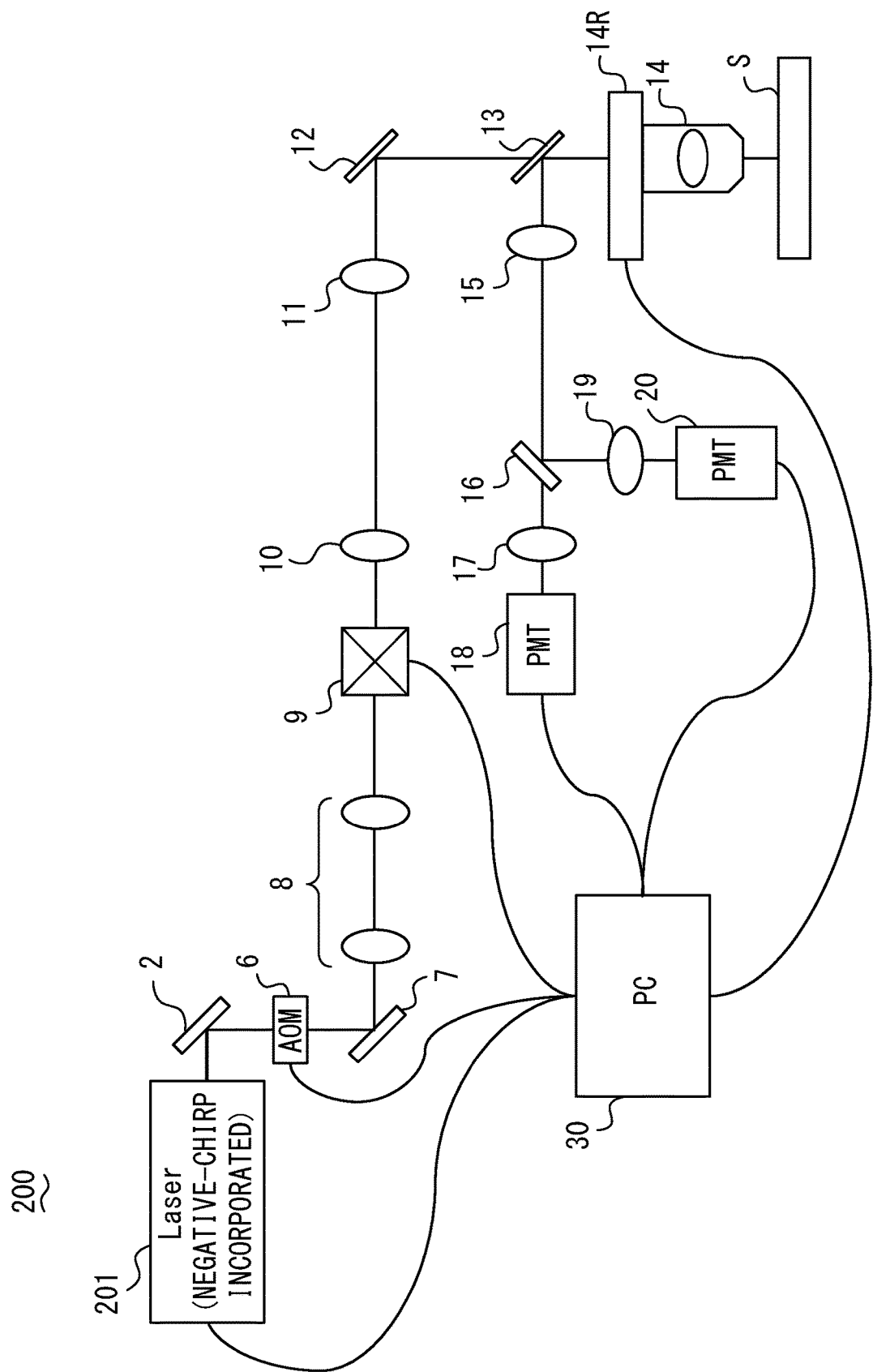
FIG. 6 illustrates the configuration of a multiphoton excitation microscope in accordance with a second embodiment.

The following describes a multiphoton excitation microscope 200 in accordance with a second embodiment. FIG. 6 illustrates the configuration of the multiphoton excitation microscope 200. The multiphoton excitation microscope 200 is different from the multiphoton excitation microscope 100 in that the multiphoton excitation microscope 200 includes a laser 201 instead of the laser 1, the prisms 3 and 4, and the mirror 5, and otherwise the multiphoton excitation microscopes 100 and 200 are the same.

The laser 201 has a dispersion compensation mechanism installed therein. For example, a chirped mirror may be used as the dispersion compensation mechanism. In particular, dispersion compensation is performed by the chirped mirror, instead of the prisms 3 and 4.

Owing to the advantage of the objective 14 reducing dispersion caused by the optical elements within the apparatus, the multiphoton excitation microscope 200 can also achieve dispersion compensation for pulsed light without the need to have the apparatus, including the dispersion compensation mechanism, large-sized.

Figure 7:
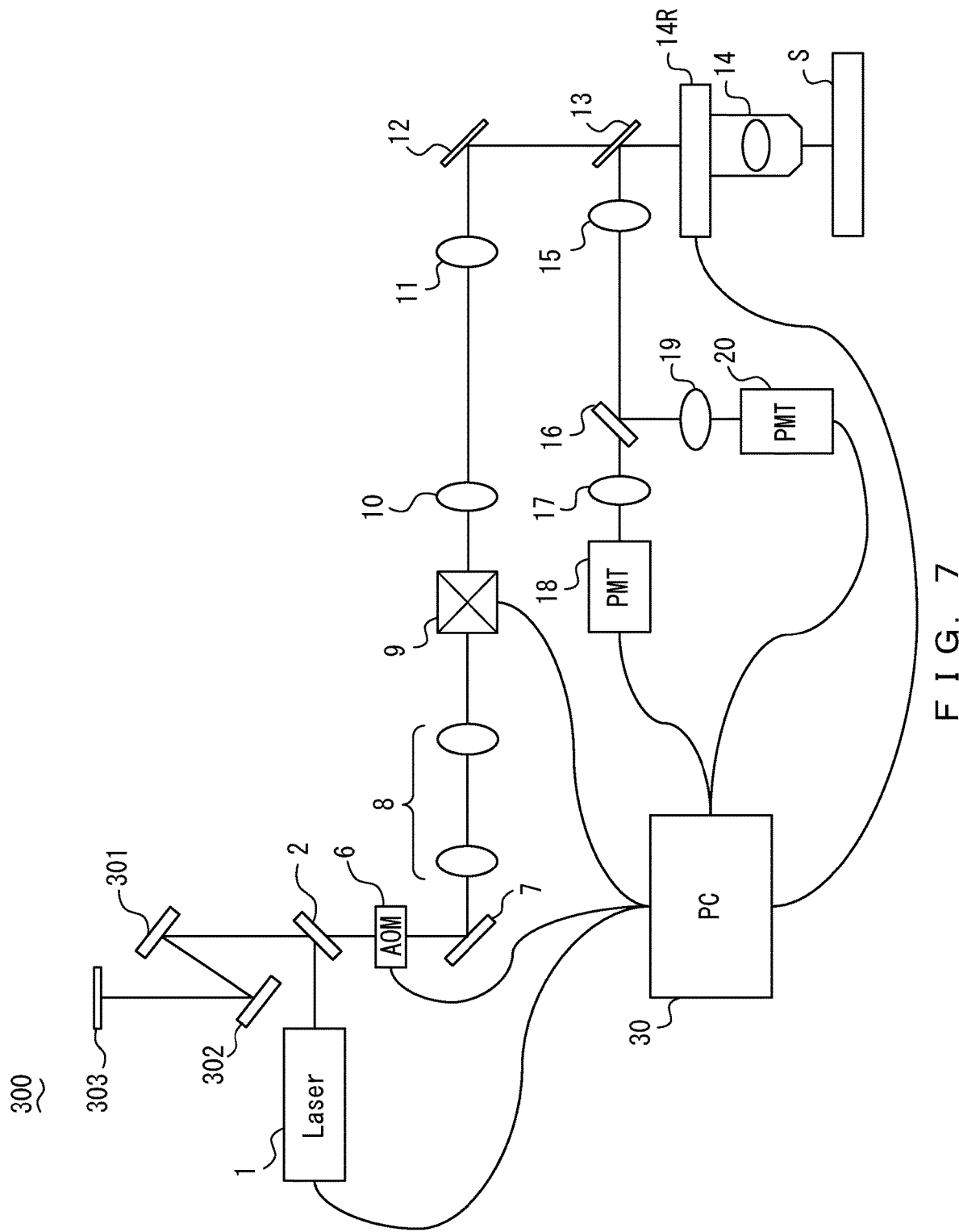
FIG. 7 illustrates the configuration of a multiphoton excitation microscope in accordance with a third embodiment.

The following describes a multiphoton excitation microscope 300 in accordance with a third embodiment. FIG. 7 illustrates the configuration of the multiphoton excitation microscope 300. The multiphoton excitation microscope 300 is different from the multiphoton excitation microscope 100 in that the multiphoton excitation microscope 300 includes gratings 301 and 302 and a mirror 303 instead of the prisms 3 and 4 and the mirror 5, and otherwise the multiphoton excitation microscopes 100 and 300 are the same.

The gratings 301 and 302 each cause negative dispersion by changing reflection positions for individual light wavelengths according to a grating period. In particular, the gratings 301 and 302 each function as a dispersion compensation mechanism.

Owing to the advantage of the objective 14 reducing dispersion caused by the optical elements within the apparatus, the multiphoton excitation microscope 300 can also achieve dispersion compensation for pulsed light without the need to have the apparatus, including the dispersion compensation mechanism, large-sized.

Figure 8:
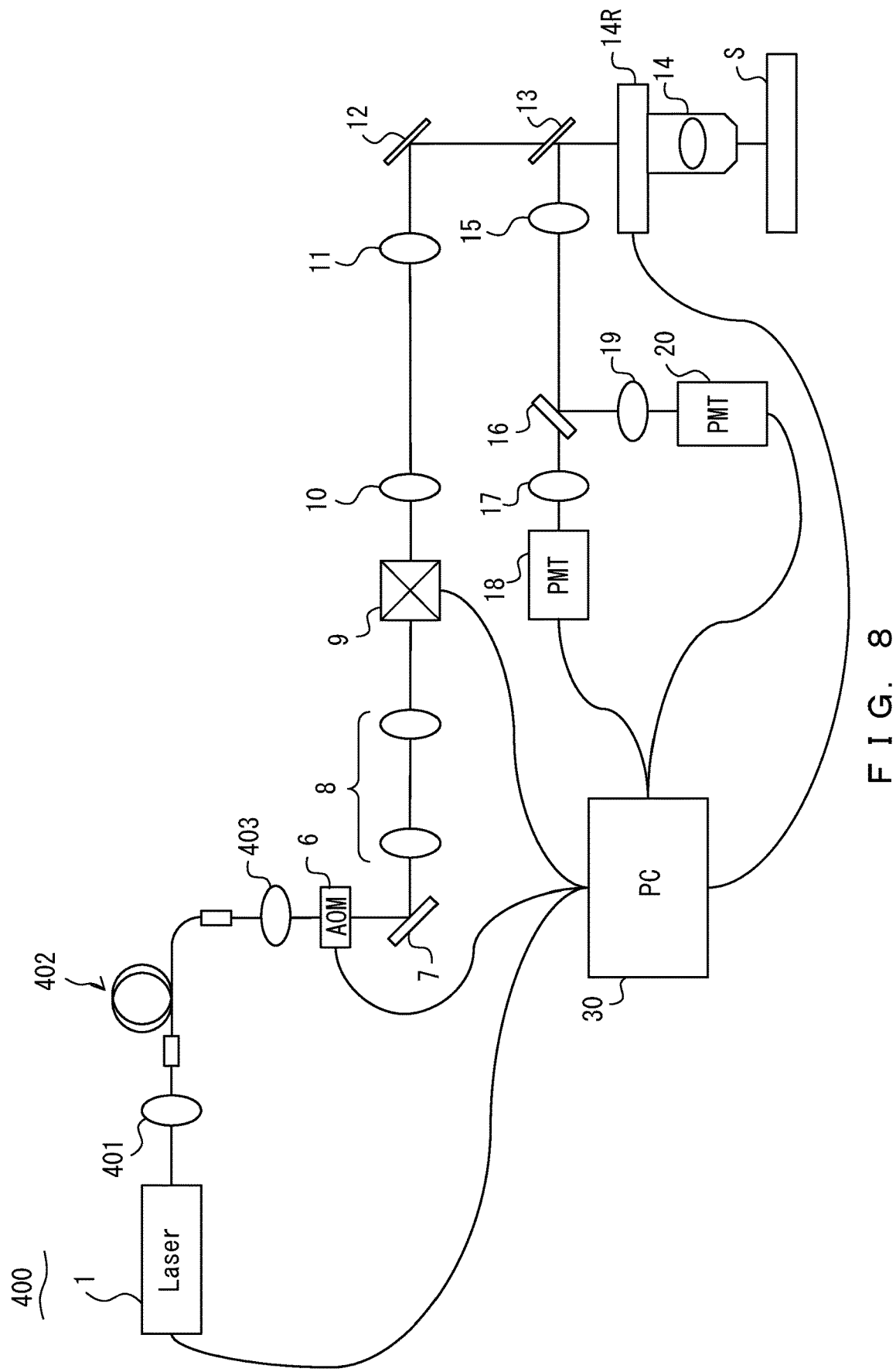
FIG. 8 illustrates the configuration of a multiphoton excitation microscope in accordance with a fourth embodiment.

The following describes a multiphoton excitation microscope 400 in accordance with a fourth embodiment. FIG. 8 illustrates the configuration of the multiphoton excitation microscope 400. The multiphoton excitation microscope 400 is different from the multiphoton excitation microscope 100 in that the multiphoton excitation microscope 400 includes a lens 401, an optical fiber 402, and a lens 403 instead of the mirror 2, the prisms 3 and 4, and the mirror 5, and otherwise the multiphoton excitation microscopes 100 and 400 are the same.

The optical fiber 402 is such that the longer the wavelength of the light component becomes, the more time the light component propagate in the cladding part. Therefore, the light component travels in the axis direction of core slowly. Accordingly, the optical fiber 402 functions as a dispersion compensation mechanism.

Owing to the advantage of the objective 14 reducing dispersion caused by the optical elements within the apparatus, the multiphoton excitation microscope 400 can also achieve dispersion compensation for pulsed light without the need to have the apparatus, including the dispersion compensation mechanism, large-sized.

Figure 9:
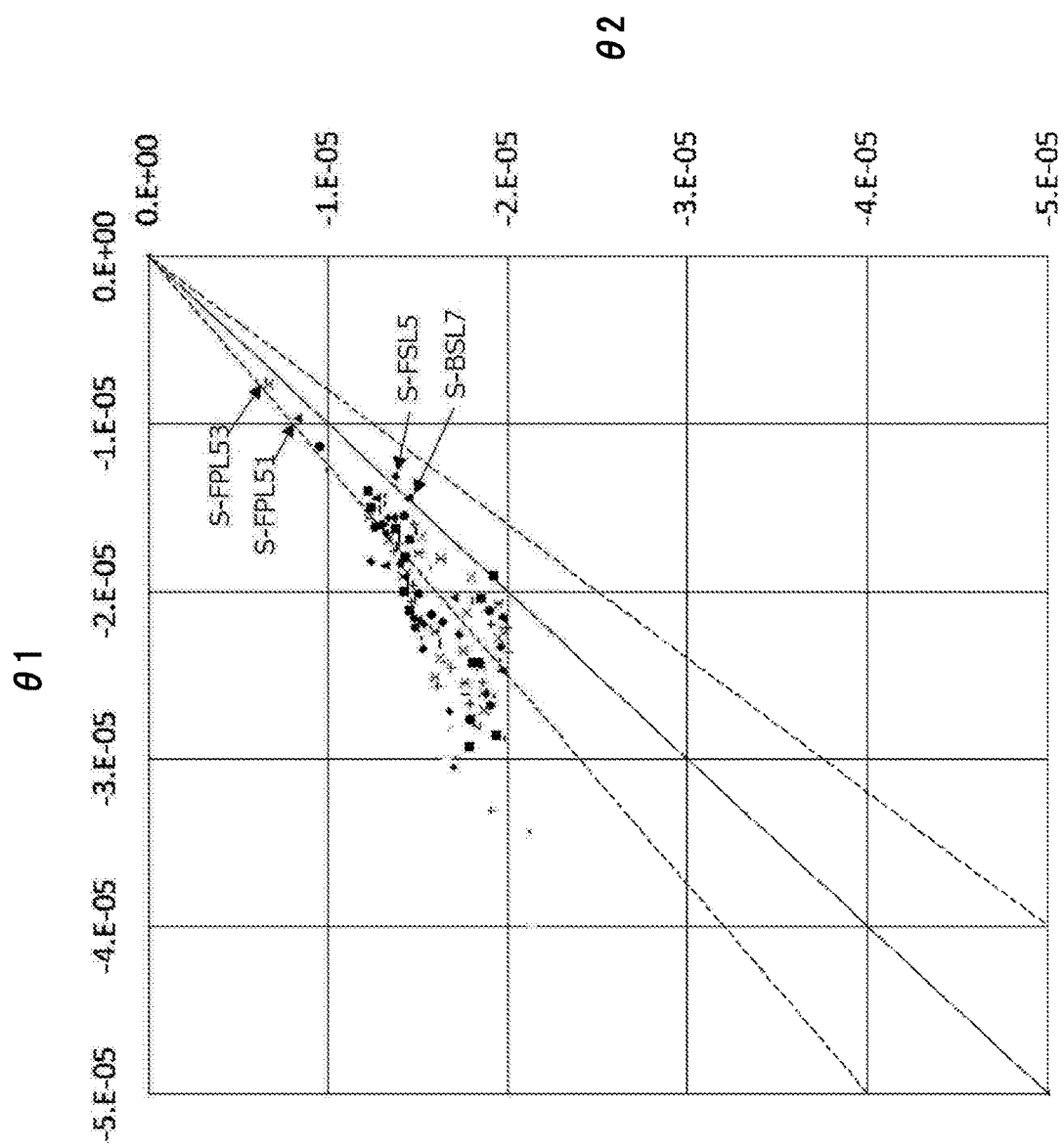
FIG. 9 illustrates a distribution of widely used glass materials that satisfy conditional expression (1) and a distribution of widely used glass materials that do not satisfy conditional expression (1)
Figure 10:
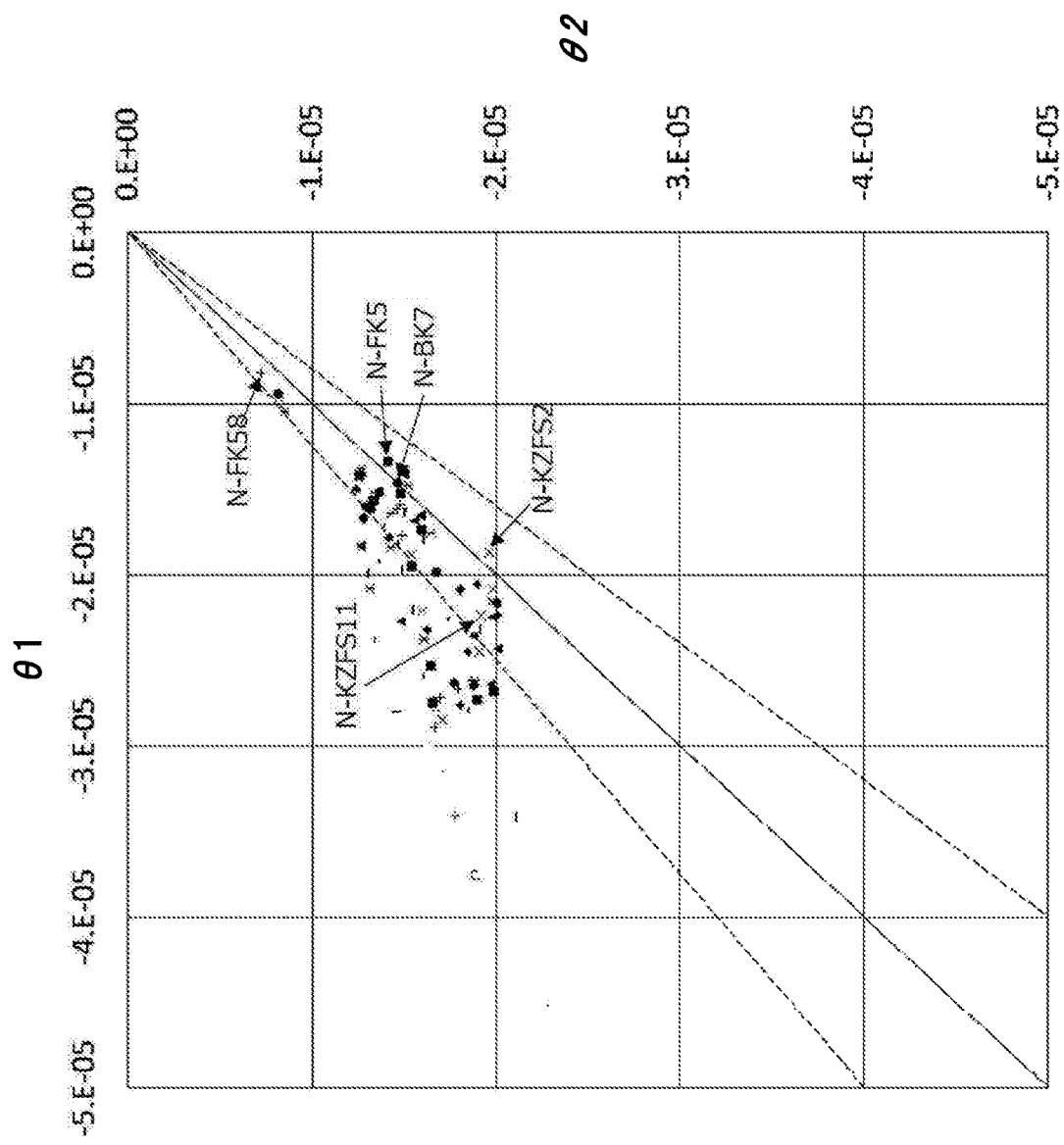
FIG. 10 illustrates a distribution of widely used glass materials that satisfy conditional expression (1) and a distribution of widely used glass materials that do not satisfy conditional expression (1).

FIGS. 9 and 10 each plot glass materials within a two-dimensional space with axes θ1 and θ2. FIGS. 9 and 10 each plot some widely used glass materials. In FIGS. 9 and 10, glass materials that satisfy conditional expression (1) are plotted between two dash lines, and glass materials that do not satisfy conditional expression (1) are plotted outside the two dash lines. S-FPL53, S-FPL51, S-FSL5, and S-BSL7 in FIG. 9 are the trademarks of glass materials provided by OHARA INC. N-FK58, N-FK5, N-BK7, N-KZFS11, and N-KZFS2 in FIG. 10 are the trademarks of glass materials provided by Schott AG.

An optical element such as an objective within a multiphoton excitation microscope may be formed by using a glass material that satisfies conditional expression (1), such as those described above, or by using media such as glass materials combined to satisfy conditional expression (1), thereby achieving the advantageous effects described above with reference to the embodiments.

The embodiments described above indicate specific examples to facilitate the understanding of the invention, and the present invention is not limited to these embodiments. Various modifications and changes can be made to the multiphoton excitation microscope and the objective herein without departing from the claims.

What is claimed is:

1. An observation apparatus comprising:
    a light source that emits pulsed light; and
    an objective that includes a first optical element serving as a light guide part and irradiates a sample with the pulsed light, wherein
    the first optical element consists of a medium that satisfies the following conditional expression for θ1 and θ2:

$$0.75 < \theta 2/\theta 1 < 1.33$$

where $\theta 1 = (n2-n1)/(\lambda 2 - \lambda 1)$ and $\theta 2 = (n3-n2)/(\lambda 3 - \lambda 2)$ are satisfied (λ1 indicates a light wavelength of 706.52 nm; λ2 indicates a light wavelength of 1529.6 nm; λ3 indicates a light wavelength of 2325.4 nm; and n1, n2, and n3 respectively indicate refractive indexes that the medium has for λ1, λ2, and λ3).

2. The observation apparatus of claim 1, further comprising:
    a scanner that performs scanning with the pulsed light; and
    a second optical element disposed between the scanner and the objective, wherein
    the second optical element consists of the medium that satisfies the conditional expression.

3. The observation apparatus of claim 2, further comprising:
    a third optical element different from the first and second optical elements that is disposed within the observation apparatus, wherein
    the third optical element consists of the medium that satisfies the conditional expression.

4. The observation apparatus of claim 3, wherein the observation apparatus is a microscope.

5. The observation apparatus of claim 4, wherein the observation apparatus is a multiphoton excitation microscope.

6. The observation apparatus of claim 2, wherein the observation apparatus is a microscope.

7. The observation apparatus of claim 3, wherein the observation apparatus is a multiphoton excitation microscope.

8. The observation apparatus of claim 6, wherein the observation apparatus is a multiphoton excitation microscope.

9. The observation apparatus of claim 2, wherein the observation apparatus is a multiphoton excitation microscope.

10. The observation apparatus of claim 1, wherein the observation apparatus is a microscope.

11. The observation apparatus of claim 10, wherein the observation apparatus is a multiphoton excitation microscope.

12. The observation apparatus of claim 1, wherein the observation apparatus is a multiphoton excitation microscope.

13. An objective comprising:
an optical element serving as a light guide part, wherein the optical element consists of a medium that satisfies the following conditional expression for $\theta 1$ and $\theta 2$:

$$0.75 < \theta 2/\theta 1 < 1.33$$

where $\theta 1=(n2-n1)/(\lambda 2-\lambda 1)$ and $\theta 2=(n3-n2)/(\lambda 3-\lambda 2)$ are satisfied ($\lambda 1$ indicates a light wavelength of 706.52 nm; $\lambda 2$ indicates a light wavelength of 1529.6 nm; $\lambda 3$ indicates a light wavelength of 2325.4 nm; and n1, n2, and n3 respectively indicate refractive indexes that the medium has for $\lambda 1$, $\lambda 2$, and $\lambda 3$).

* * * * *